D. P. & M. P. Farnham,
Foot Warmer.
No. 60,869. Patented Jan. 1, 1867.
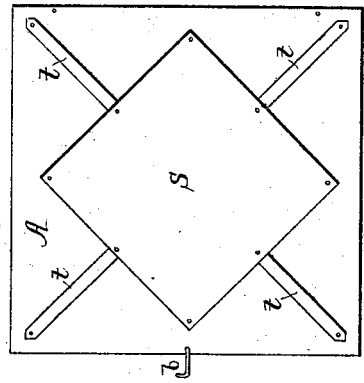
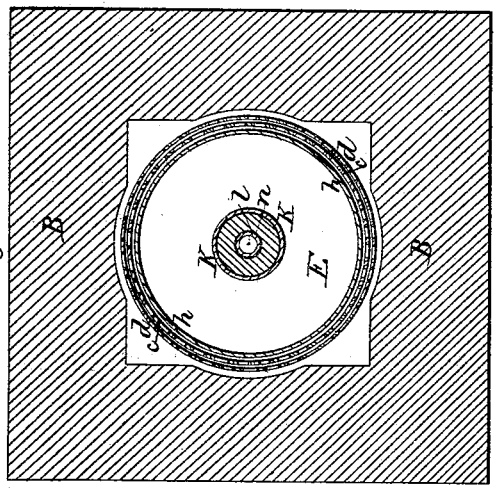
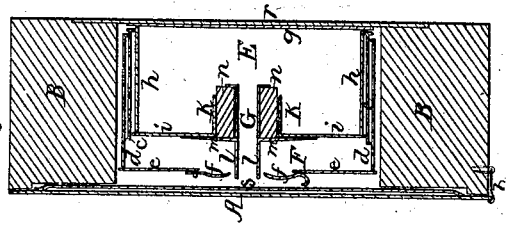
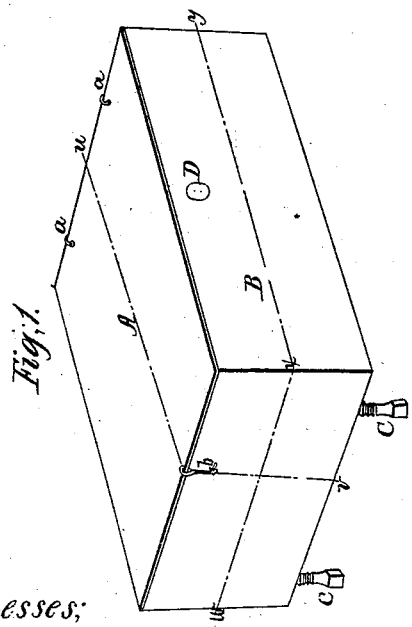
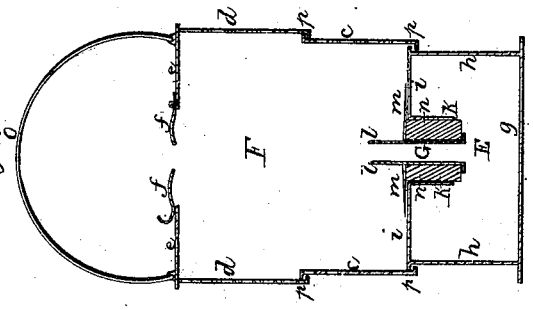
Witnesses:
Sylvanus D. Locke.
John M. May.
Inventors.
Daniel T. Farnham.
Moses P. Farnham.

United States Patent Office.

DANIEL P. FARNHAM AND MOSES P. FARNHAM, OF JANESVILLE, WISCONSIN.

Letters Patent No. 60,869, dated January 1, 1867.

---

COMBINED FOOT-STOVE AND LANTERN.

---

The Schedule referred to in these Letters Patent and making part of the same.

---

TO WHOM IT MAY CONCERN:

Be it known that we, MOSES P. FARNHAM and DANIEL P. FARNHAM, of Rock county, and State of Wisconsin, have invented a new and useful Foot-Stove, Lamp, and Lantern combined; and we do hereby declare that the following is a full, clear, and exact description thereof, reference being had to the accompanying drawings, making part of this specification; the same letters of reference indicating the same part in each figure.

The nature of our invention consists in making a foot-stove so as to receive a lamp and utilize the heat thereof by distributing the heat gently and evenly over the top or lid of the stove by means of a double metallic lid, having on its under side heat distributors or conductors to reach the extreme corners of the lid; also, in making a foot-stove with extension legs on one side of the bottom thereof to lengthen or shorten the same so as to give the stove any desired inclination; also, in constructing the lamp used to warm said stove in a telescopic form so that it may be closed to form a lamp and elongated to use as a lantern.

Figure 1 is a perspective view of our foot-stove ready for use.

Figure 2 is a perpendicular view of fig. 1, cut through its centre from $w$ to $b$, and from $b$ to $v$.

Figure 3 is a view of fig. 1, cut through its centre from $w$ to $x$, and from $x$ to $y$.

Figure 4 is a view of our lamp and lantern, cut through its centre perpendicularly, and elongated for use as a lantern.

Figure 5 is the under side of the lid or top of our foot-stove, showing the plate that receives the heat from the lamp, whence it is conducted or distributed to the corners of the lid.

B is the foot-stove. A is the lid or top. The stove itself may be made of wood, except the top, which must be metallic. The top is hinged at $a\ a$, and held by hook $b$, or it may be made fast to the stove and open at some point below the top, as from $w$ to $x$, and from $x$ to $y$. D is an aperture or hole through which to supply air to the lamp. Any suitable number may be made. C C are legs that may be elongated or contracted for the purpose of giving the desired inclination to the stove. These legs may be screws, as shown, or made in any suitable manner to contract and elongate, for the purposes described. E is the lamp, composed of bottom $g$, sides $h$, and top $i$. It has tube G, with burner $l$, and cap $m$. Between G and $k$ is cork $n$. This cork surrounds the tube to which it is attached, as shown, and takes the place, or serves to keep the space between the burner and lamp tight, instead of a screw, it being much cheaper, more quickly used, and less liable to be out of repair than a screw, as in the usual mode, and moreover can be cheaply renewed without the tools and mechanical skill for screw cutting. F shows the telescopic sections with their sides $c$ and $d$, flanches $p$, and top $e$, also bail $o$, to be used when it serves as a lantern. These sections may be made of glass, or perforated if made of metal. Fig. 4 shows the parts elongated as a lantern, while figs. 2 and 3 show the parts together to use as a lamp inside the foot-stove. The burner $l$ extends upward through cap $f$, (fig. 2,) which cap is hinged or otherwise attached to the top $e$. This cap $f$ is to close an aperture through top $e$, which aperture is for convenience of placing and removing the burner and cork (in the lamp) without the necessity of separating sections $c$ and $d$ from the lamp. In fig. 5, $s$ is a plate smaller than plate or lid A, which is placed a little distance from plate A on its under side, and has metallic bars or straps $t$ extending from it to the corners of A, which straps serve to conduct the heat as it is communicated from the lamp to plate $s$ to the extreme corners of lid A, giving an even and uniform heat to the lid. The upper side of the lid may be covered by a piece of carpeting or other suitable material for comfort and convenience in using our foot-stove.

We are aware that a foot-stove with a lamp therein has been used, and we do not claim that, or a device analogous thereto; but what we do claim as our invention, and desire to secure by Letters Patent, is—

1. Plate $s$, heat distributors $t\ t\ t\ t$, and lid A, when constructed and combined substantially as and for the purposes described.

2. The foot-stove A B, lamp and lantern E F, when constructed and combined substantially as and for the purposes described.

DANIEL P. FARNHAM,
MOSES P. FARNHAM.

Witnesses:
JOHN M. MAY,
JED. M. HASELTON.